United States Patent
Shenoy et al.

(10) Patent No.: US 7,499,447 B2
(45) Date of Patent: Mar. 3, 2009

(54) SYNCHRONIZING MULTIPLE INSTANCES OF A FORWARDING INFORMATION BASE (FIB) USING SEQUENCE NUMBERS

(75) Inventors: Shiva Shenoy, San Jose, CA (US); Apurva Mehta, Cupertino, CA (US)

(73) Assignee: Alcaltel-Lucent USA Inc., Murray Hill, NJ (US)

( * ) Notice: Subject to any disclaimer, the term of this patent is extended or adjusted under 35 U.S.C. 154(b) by 1010 days.

(21) Appl. No.: 10/446,762

(22) Filed: May 28, 2003

(65) Prior Publication Data

US 2003/0235195 A1 Dec. 25, 2003

Related U.S. Application Data

(60) Provisional application No. 60/385,858, filed on Jun. 4, 2002, provisional application No. 60/385,925, filed on Jun. 4, 2002.

(51) Int. Cl.
*H04L 12/28* (2006.01)

(52) U.S. Cl. .................. 370/389; 370/503; 709/201; 713/375

(58) Field of Classification Search .......... 370/235, 370/389–394, 401, 337, 338, 447; 709/224–228; 720/14; 455/426.1
See application file for complete search history.

(56) References Cited

U.S. PATENT DOCUMENTS

| | | | | |
|---|---|---|---|---|
| 6,735,198 | B1 * | 5/2004 | Edsall et al. | 370/389 |
| 6,966,003 | B1 * | 11/2005 | Joseph et al. | 726/14 |
| 7,102,999 | B1 * | 9/2006 | Sindhu et al. | 370/235 |
| 7,177,295 | B1 * | 2/2007 | Sholander et al. | 370/338 |
| 2002/0018489 | A1 | 2/2002 | Ambe et al. | |
| 2002/0177437 | A1 * | 11/2002 | Chesavage et al. | 455/426 |

* cited by examiner

*Primary Examiner*—Hassan Kizou
*Assistant Examiner*—Emmanuel Maglo

(57) ABSTRACT

Synchronizing multiple instances of an FIB in a network node that has a distributed processing architecture involves associating sequence numbers with all of the FIB entries that are stored with each instance of the FIB and using the sequence numbers that are associated with the FIB entries to determine the most current FIB entry. In one embodiment, the sequence numbers are used to determine the most current FIB entry among two matching FIB entries that have matching information (i.e., matching destination IP addresses and masks). In another embodiment, the sequence numbers are used to identify a line card with the most current FIB entry.

21 Claims, 7 Drawing Sheets

SYNCHRONIZING MULTIPLE INSTANCES OF A FORWARDING INFORMATION BASE (FIB) USING SEQUENCE NUMBERS

CROSS-REFERENCE TO RELATED APPLICATION

This application is entitled to the benefit of provisional U.S. Patent Application Ser. No. 60/385,858, filed 4 Jun. 2002 and provisional U.S. Patent Application Ser. No. 60/385,925, filed 4 Jun. 2002.

FIELD OF THE INVENTION

The invention relates to synchronizing multiple instances of a forwarding information base (FIB), and more particularly, to synchronizing instances of an FIB that exist in a control module and multiple line cards of a distributed architecture switch/router.

BACKGROUND OF THE INVENTION

Network devices such as switches and or routers (switch/routers) are used to forward traffic in packet-based networks. A typical switch/router is a chassis-based system that includes a control module, which performs higher level management functions, and line cards, which provide the interface between the switch/router and other network devices (i.e., servers, workstations, other switch/routers, etc.) A switch/router generates a forwarding information base (FIB) that maps traffic destination information to next hop information. The FIB is typically generated and managed in the control module of a switch/router by a route processor. The FIB is used by a forwarding engine to make forwarding decisions. First generation switch/routers typically used a centralized architecture to make forwarding decisions for traffic that is received on line cards. In a centralized architecture, forwarding decisions for traffic received on all of the line cards of a switch/router are made by a single central forwarding engine. Some newer generation switch/routers use a distributed architecture to make forwarding decisions for incoming traffic. In a distributed architecture, forwarding decisions for traffic received on the line cards can be made by forwarding engines that exist at each line card. In order for forwarding decisions to be made locally by line card-specific forwarding engines, the line card-specific forwarding engines must have access to an instance of the FIB that is maintained at the control module. Direct access to an instance of the FIB is accomplished by maintaining an instance of the FIB at each line card. Because the FIB that is maintained at the control module may be changing, it is important to ensure that the instance of the FIB that is maintained at the control module is synchronized with the instances of the FIBs that are maintained at the line cards.

While the task of maintaining synchronization between instances of the FIB at the control module and the line cards is not too resource intensive during normal operation, the task of synchronizing instances of the FIB can be extremely resource intensive upon restarting a line card or a control module after a down period. For example, a known technique for maintaining synchronization between the instances of an FIB at a control module and a line card after a restart of a line card involves rewriting the entire instance of the FIB at the control module to the restarted line card. While this ensures that the line card FIB is synchronized with the control module FIB, in switch/routers with large FIBs, the rewriting of the entire FIB consumes a considerable amount of resources. In addition, during the rewriting process, additional changes may be made to the control module FIB, thereby causing discrepancies between the control module FIB and the FIB that was just written to the line card.

In view of the growing use of distributed architecture switch/routers and the need to maintain synchronized FIBs, what is needed is a resource efficient technique for maintaining synchronization between multiple instances of an FIB in switch/routers that have distributed architectures.

SUMMARY OF THE INVENTION

Synchronizing multiple instances of an FIB in a network node that has a distributed processing architecture involves associating sequence numbers with the FIB entries that are stored with each instance of the FIB and using the sequence numbers that are associated with the FIB entries to determine the most current FIB entry. In one embodiment, the sequence numbers are used to determine the most current FIB entry among two FIB entries that have matching information (i.e., matching destination IP addresses and masks). In another embodiment, the sequence numbers are used to identify a line card with the most current FIB entry.

Other aspects and advantages of the present invention will become apparent from the following detailed description, taken in conjunction with the accompanying drawings, illustrating by way of example the principles of the invention.

DETAILED DESCRIPTION

Figure 1:
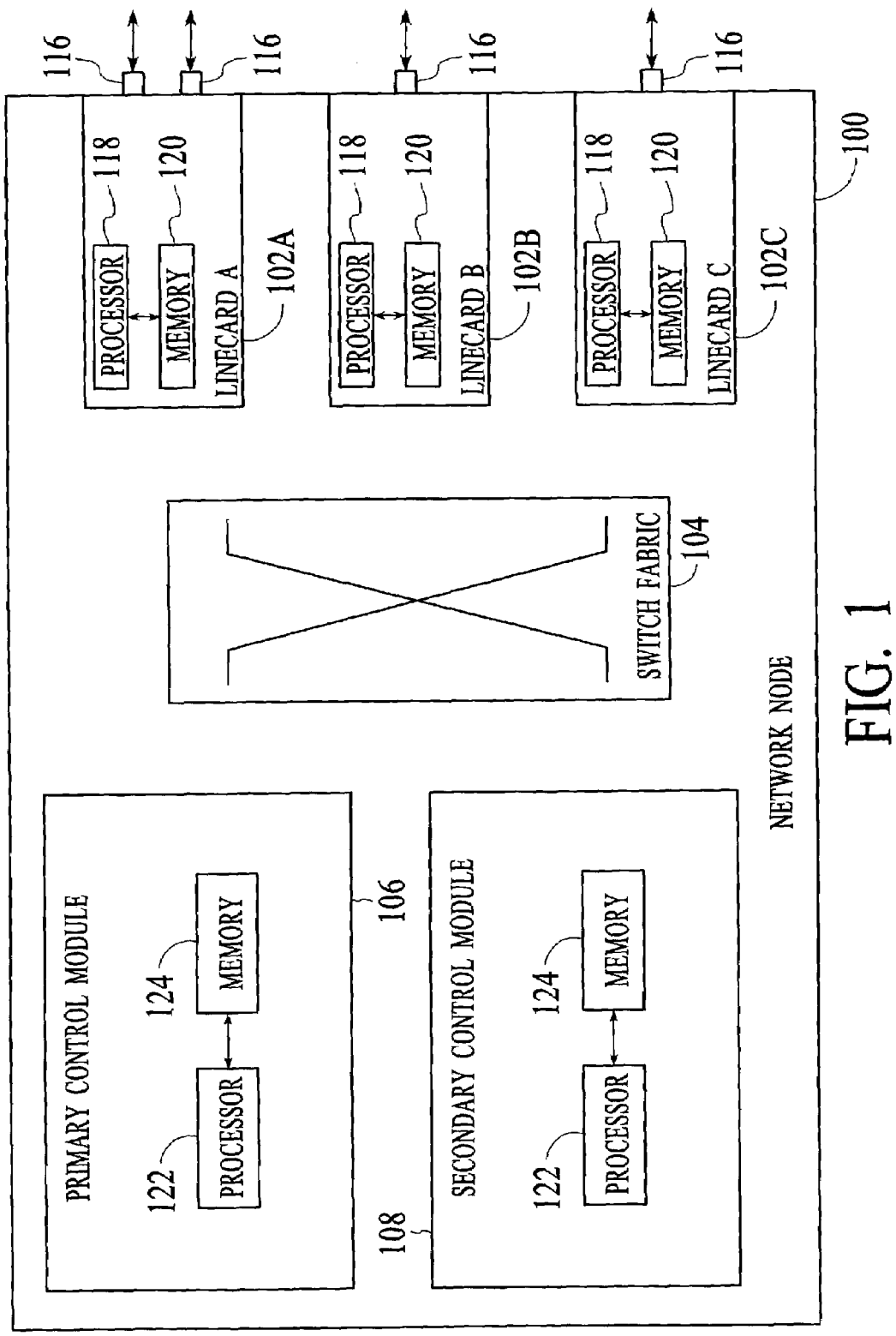
FIG. 1 depicts an embodiment of a network node that includes a primary control module, a secondary control module, a switch fabric, and three line cards (line cards A, B, and C).

FIG. 1 depicts an embodiment of a network node 100 that has a distributed processing architecture. The example network node includes a primary control module 106, a secondary control module 108, a switch fabric 104, and three line cards 102A, 102B, and 102C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The network node may include line cards that support network protocols such as Ethernet, ATM, and Frame Relay. Although an Ethernet-based switch/router is described, the disclosed FIB synchronization techniques can be applied to any network node that has a distributed architecture.

Each of the line cards includes at least one port 116, a processor 118, and memory 120, which perform functions such as receiving traffic into the network node, buffering traffic, storing instances of an FIB, making forwarding decisions, and transmitting traffic from the network node. The processor within each line card may include a multifunction processor and/or an application specific processor that is operationally connected to the memory. The processor performs functions such as packet parsing, packet classification, and making forwarding decisions. The memory within each line card may include circuits for storing operational code, for buffering traffic, for storing an instance of an FIB, and for storing other data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include configuration state information and traffic forwarding information (i.e., the FIB). Forwarding information may also be stored in content addressable memory (CAM) or a combination of CAM and RAM. Although the processor and memory are depicted as separate functional units, in some instances, the processor and memory are integrated onto the same device. In addition, there may be more than one discrete processor unit and more than one memory unit on the line cards.

The switch fabric 104 provides datapaths between input ports and output ports and may include, for example, shared memory, shared bus, and crosspoint matrices. Although not depicted, the network node 100 may be equipped with redundant switch fabrics.

The primary and secondary control modules 106 and 108 support various functions, such as network management functions and protocol implementation functions. Example network management functions that are performed by the control modules include implementing configuration commands, providing timing control, updating FIBs, programming hardware tables, providing system information, supporting a user interface, managing hardware changes, bus management, and protocol processing. Example protocols that are implemented by the control modules include Layer 2 (L2) protocols, such as L2 Learning, STP, and LACP and Layer 3 (L3) protocols such as OSPF, BGP, and ISIS. The layers are defined by the ISO in the OSI model.

Each of the control modules 106 and 108 includes a processor 122 and memory 124 for carrying out the designated functions. The processor within each control module may include a multifunction microprocessor and/or an application specific processor that is operationally connected to the memory. The memory may include EEPROM or flash ROM for storing operational code and DRAM for buffering traffic and storing data structures, such as an instance of the FIB. Although the processor and memory are depicted as separate functional units, in some instances, the processor and memory are integrated onto the same device. In addition, there may be more than one discrete processor unit and more than one memory unit on the control modules. Throughout the description, similar reference numbers may be used to identify similar elements.

In an embodiment, forwarding information is generated by the primary control module processor and managed centrally at the primary control module. Throughout the description, a set of forwarding information (i.e., a set of routing information) is referred to as a forwarding information base (FIB). An instance of an FIB is maintained at the primary control module and is referred to herein as the "main FIB." Instances of the FIB are also maintained at the secondary control module and at the line cards. The instance of the FIB that is maintained at the secondary control module is referred to as the "backup FIB" and the instances of the FIBs that are maintained at the line cards are referred to as the "line card FIBs." In an embodiment, the FIB entries in each FIB are lexicographically ordered. Lexicographically ordering entries in an FIB is well known in the field of packet-based communications.

Figure 2:
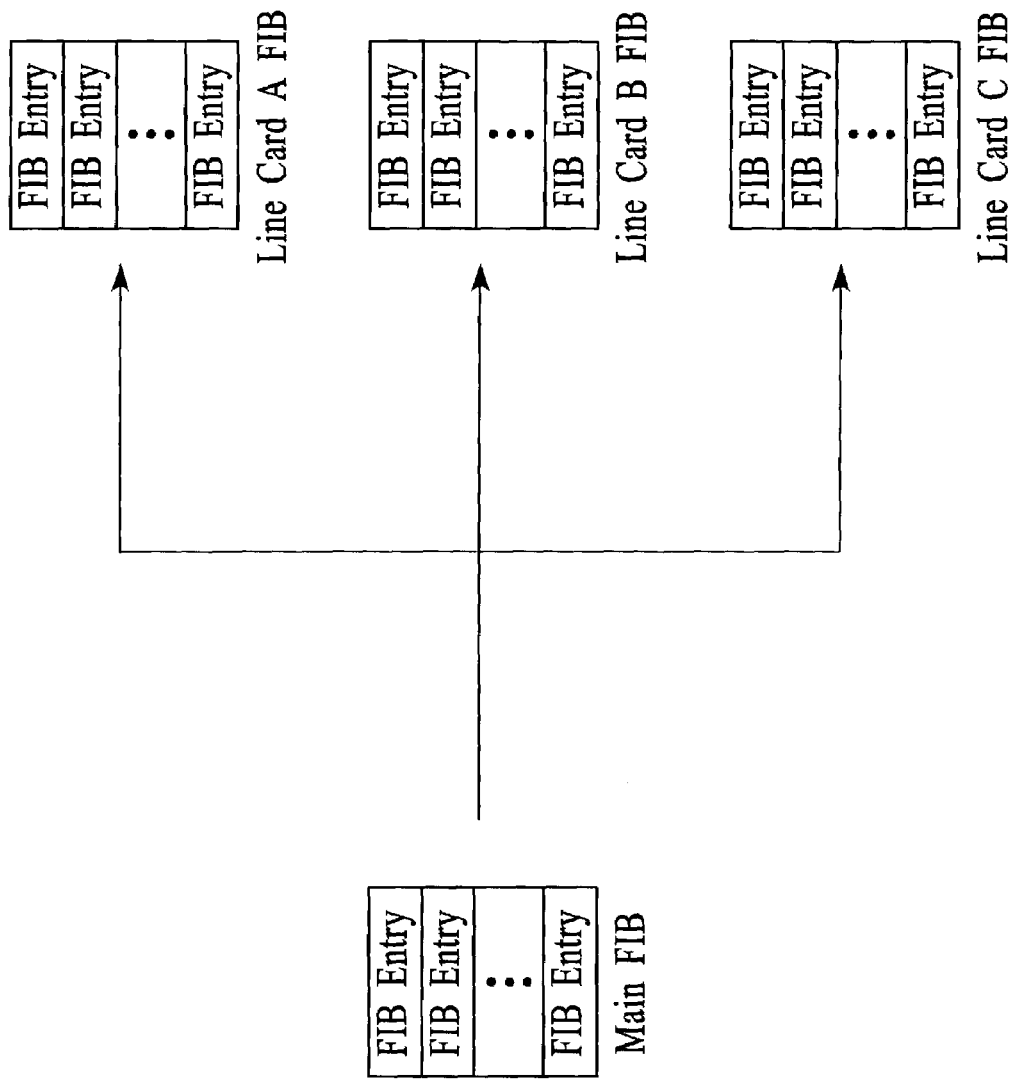
FIG. 2 depicts the distribution of the contents of the main FIB to multiple line card FIBs.

The instances of the backup and line card FIBs are formed by communicating the contents of the main FIB to the secondary control module and to the line cards, respectively. Communicating the contents of the main FIB to the secondary control module and to the line cards typically involves an initial transfer of the entire main FIB upon initialization followed by periodic FIB updates that reflect only changes that have been made to the main FIB. FIG. 2 depicts the distribution of the contents of the main FIB to multiple line card FIBs. The periodic FIB updates of the line card FIBs may include adding new FIB entries, deleting existing FIB entries, and/or changing existing FIB entries. While periodic updates work well when the control module and all of the line card FIBs are operating properly, if, for example, a line card temporarily goes down, the line card will likely miss some of the FIB updates while it is down. Upon restart of the down line card, the majority of its line card FIB entries will be correct except for the changes that would have been made in response to the missed FIB updates. A known technique to ensure that a line card FIB is synchronized with a main FIB upon restart involves rewriting the entire main FIB to the line card FIB after any restart occurrence. In order to avoid the resource intensive task of rewriting the entire main FIB to the line card FIB, in accordance with an embodiment of the invention, sequence numbers are associated with each new or changed FIB entry and the sequence numbers are used to determine how to synchronize instances of the FIB. In particular, the sequence numbers are used to determine the most current FIB entry among multiple FIB entries. The sequence numbers allow the network node to achieve efficient synchronization between the line card FIBs and the main FIB and/or the backup FIB.

Figure 3:
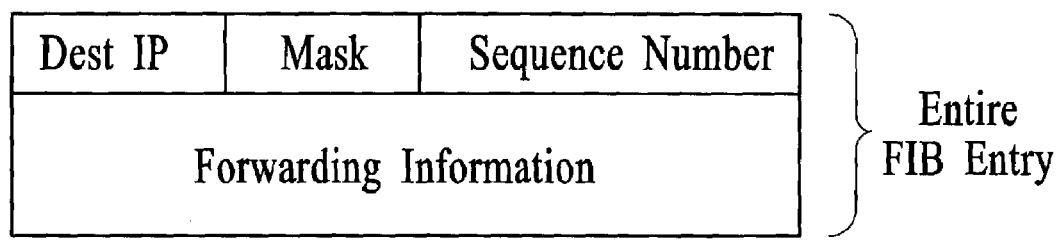
FIG. 3 depicts an example of an FIB entry that includes a sequence number field in accordance with an embodiment of the invention.

FIG. 3 depicts an example of an FIB entry that includes a sequence number field in accordance with an embodiment of the invention. In one embodiment, sequence numbers that are stored in the sequence number field are used to determine the most current FIB entry among two matching FIB entries that have matching information (i.e., matching destination IP addresses and masks). In another embodiment, the sequence numbers are used to identify a line card with the most current FIB entry. Both embodiments are described in more detail below. The FIB entry depicted in FIG. 3 includes a destination IP field, a mask field, a sequence number field, and a forwarding information field. The destination IP field identifies a destination IP address of the FIB entry. The mask field identifies the bits of the destination IP address field that are significant in a match operation. Masking is a well known technique that involves identifying bits that are insignificant in a matching operation. The sequence number field identifies a sequence number that is associated with the FIB entry. In an embodiment, the sequence number is a sequential number that is obtained from a sequence number generator. In an embodiment, the destination IP field is 32 bits, the mask field is 8 bits, and the sequence number field is 32 bits although this is implementation specific. The forwarding information field includes forwarding information that is associated with the destination IP address and mask fields. The forwarding information field may include forwarding information such as interface information (i.e., port identifiers), VPN information, QoS information, statistics, pointers to additional forwarding information, etc. In an embodiment, the forwarding information field is 256 bytes although this is implementation specific.

Figure 4:
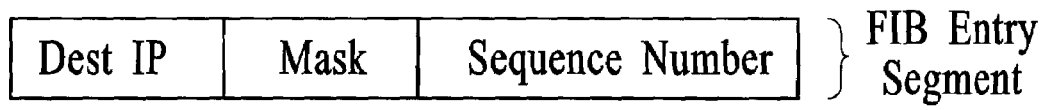
FIG. 4 depicts an example of an FIB entry segment that includes a sequence number field in accordance with an embodiment of the invention.

In an embodiment, FIB entry segments are sent from the line card FIBs to the main FIB and compared to the main FIB entries to determine how to update the line card FIBs. FIB entry segments include only a portion of an entire FIB entry. FIG. 4 depicts an example of an FIB entry segment. In the embodiment of FIG. 4, the FIB entry segment includes only the destination IP field, the mask field, and the sequence number field from the entire FIB entry of FIG. 3. That is, the FIB entry segment does not include the forwarding information that is associated with the FIB entry. As indicated above with regard to FIG. 3, the forwarding information field is typically much larger in size than the IP address, mask, and sequence number fields combined.

Figure 5:
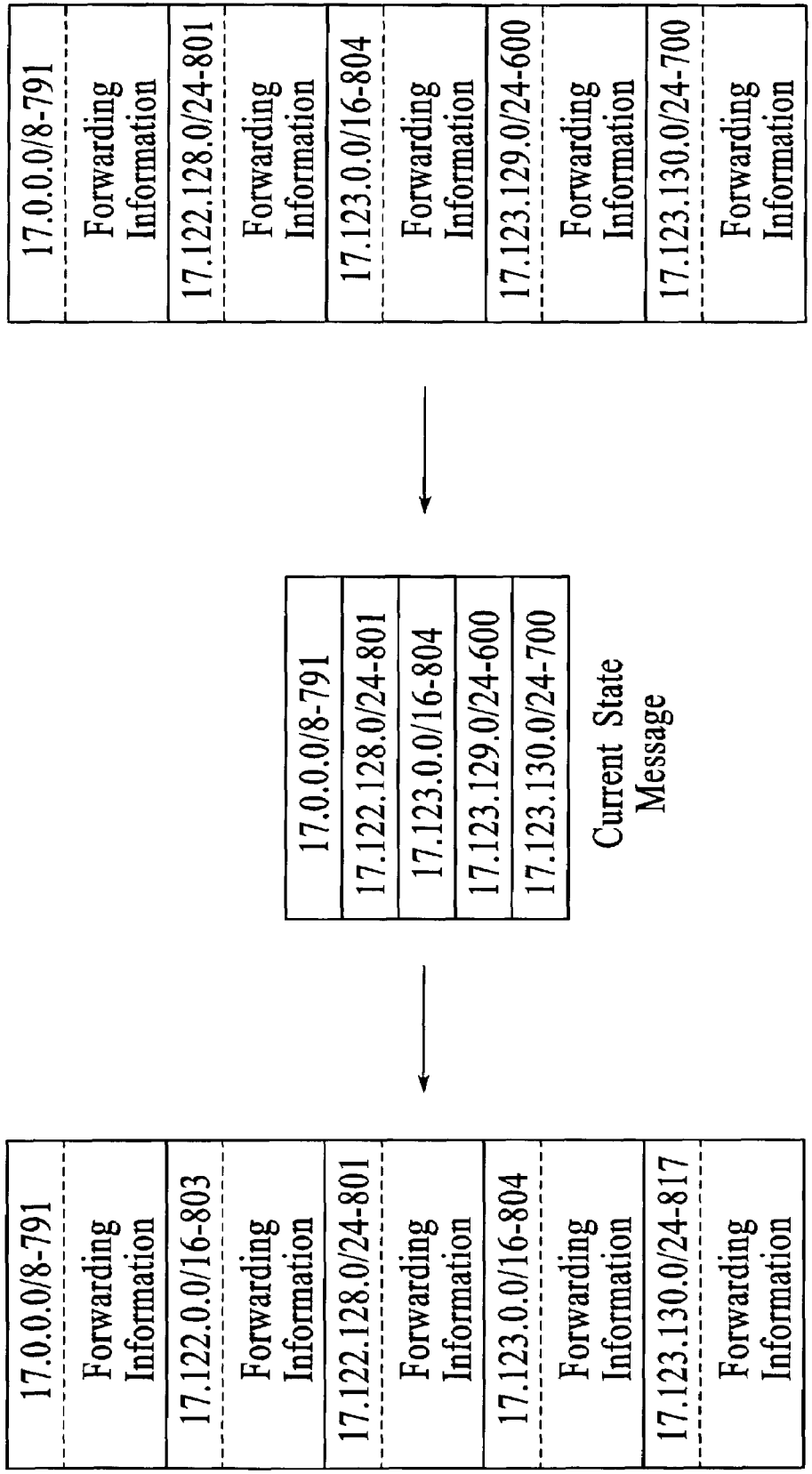
FIG. 5 illustrates a current state message that is sent from an instance of a line card FIB to an instance of a main FIB in accordance with an embodiment of the invention.
Figure 6:
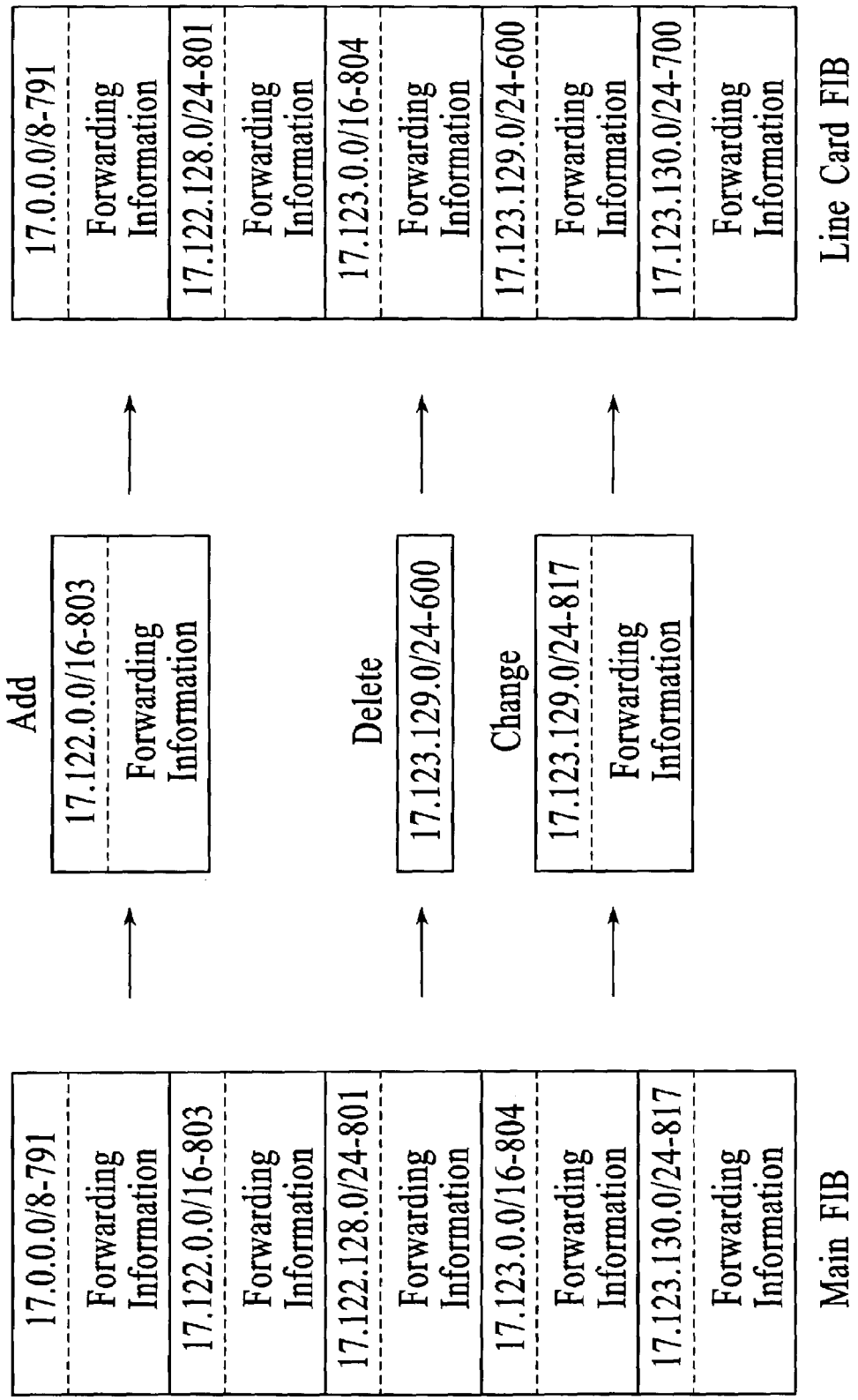
FIG. 6 depicts the messages that are needed to synchronize the line card FIB depicted in FIG. 5 with the main FIB depicted in FIG. 5.

FIGS. 5 and 6 depict an example of how FIB entry segments are used to synchronize a line card FIB with a main FIB. In particular, FIGS. 5 and 6 illustrate how the sequence numbers are used to determine the most current FIB entry among two matching FIB entries. In accordance with an embodiment of the invention, FIB entry segments are used to determine how to update a line card FIB to synchronize the line card FIB with the main FIB. FIG. 5 depicts an instance of a line card FIB, an instance of a main FIB, and a current state message. In the embodiment of FIG. 5, the instances of the two FIBs include multiple FIB entries (as depicted in FIG. 3) and the current state message includes multiple FIB entry segments (as depicted in FIG. 4). In operation, current state messages are sent from the line card to the control module. In an embodiment, each current state message includes a lexicographically ordered set of FIB entry segments. Because FIBs may include thousands of entries, the FIB entry segments are sent in lexicographically ordered sets using multiple current state messages. Referring to FIG. 5, a current state message related to the line card FIB is sent to the control module. The control module compares the FIB entry segments in the current state message to the main FIB to determine differences between the line card FIB and the main FIB. In the example of FIG. 5, the comparison yields the following results:

|     | Main FIB Entry      | FIB Entry Segment   | Synch Action       |
| --- | ------------------- | ------------------- | ------------------ |
| (1) | 17.0.0.0/8-791      | 17.0.0.0/8-791      | no action          |
| (2) | 17.122.0.0/16-803   | no equivalent entry | add entry          |
| (3) | 17.122.128.0/24-801 | 17.122.128.0/24-801 | no action          |
| (4) | 17.123.0.0/16-804   | 17.123.0.0/16-804   | no action          |
| (5) | no equivalent entry | 17.123.129.0/24-600 | delete entry       |
| (6) | 17.123.130.0/24-817 | 17.123.130.0/24-700 | change entry       |

As illustrated in the comparison example, FIB entry segments from the line card FIB, which have IP addresses, masks, and sequence numbers that match main FIB entries, require no action (example lines (1), (3), and (4)). No action is required because the respective FIB entries are the same. When there is no equivalent FIB entry segment in a current state message to an FIB entry in the main FIB, this indicates that the line card FIB is lacking a needed FIB entry. A new FIB entry should be added to the line card FIB (example line (2)) to ensure synchronization between the line card and main FIBs. When there is no equivalent FIB entry in the main FIB to an FIB entry segment in a current state message, this indicates that the line card FIB is maintaining an FIB entry that is no longer needed (example line (5)). Typically, the FIB entry has been aged out of the main FIB but still remains in the line card FIB. The corresponding FIB entry in the line card FIB should be deleted to ensure synchronization between the line card and main FIBs. When the destination IP and mask fields of an FIB entry segment match the destination IP and mask fields of an entry in the main FIB, the sequence numbers associated with the two FIB entries are used to determine the most current FIB entry (example line (6)) among the two FIB entries. For example, if the sequence number of the main FIB entry is higher than the sequence number of the FIB entry segment, this indicates that the FIB entry in the main FIB has been changed since the FIB entry in the line card was added or changed. A change in an FIB entry involves a change in the forwarding information that is associated with the entry. Changes may include, for example, the identification of a different output interface or a change in a Next Hop IP address. In the example of line (6), the FIB entry in the main FIB has a sequence number of 817 while the corresponding FIB entry segment has a sequence number of 700. The higher sequence number of the FIB entry in the main FIB indicates that the main FIB entry has more current forwarding information than the corresponding line card FIB entry. Because the forwarding information in the main FIB entry is more current than the forwarding information in the corresponding line card FIB entry, the FIB entry in the main FIB is written to the line card FIB. In an embodiment, the operation of changing an existing FIB entry is similar to the operation of adding a new FIB entry in that the entire FIB entry is written to the target FIB. If the sequence numbers of the two entries are the same, this indicates that the FIB entries are the same and therefore no change to the line card FIB is required as described with reference to lines (1), (3), and (4).

As a result of the comparison between the FIB entry segments in the current state message and the FIB entries in the main FIB, messages necessary to synchronize the two instances of the FIBs are generated at the control module and sent to the respective line card. FIG. 6 depicts messages that are needed to synchronize the line card FIB with the main FIB. In the example of FIG. 6, FIB entry 17.122.0.0/16 needs to be added to the line card FIB, so the entire FIB entry is sent to the line card FIB. FIB entry 17.123.129.0/24 needs to be deleted from the line card FIB, so a delete message is sent to the line card FIB, and FIB entry 17.123.130.0/24 needs to be changed in the line card FIB, so the entire FIB entry is sent to the line card FIB. Although the synchronization messages are depicted as distinct messages, multiple synchronization operations could alternatively be communicated in a common message.

Although the current state messages are described as being sent from the line cards to the control module, in an alternative embodiment, the current state messages could be sent from the control module to the line cards. The comparison operation would take place at the line cards and necessary synchronization actions would be communicated to the control module. The control module would then generate the update messages necessary to achieve synchronization between the instances of the FIB.

Using FIB entry segments to identify differences between a main FIB and a line card FIB avoids having to send all of the current FIB entries between the line card and the control module. As described above, only the FIB entries that are needed to update a line card FIB need to be sent between the control module and line card. The use of FIB segments is made possible by the sequence numbers because the sequence numbers allow the most current FIB entry to be identified among an FIB entry and an FIB entry segment that have matching IP address and mask values. If it were not for the sequence numbers, the only way to determine if the forwarding information is different between two FIB entries with matching information (i.e., destination IP address and mask) would be to compare the contents of the forwarding information itself. As described above, that is a resource intensive task.

Figure 7:
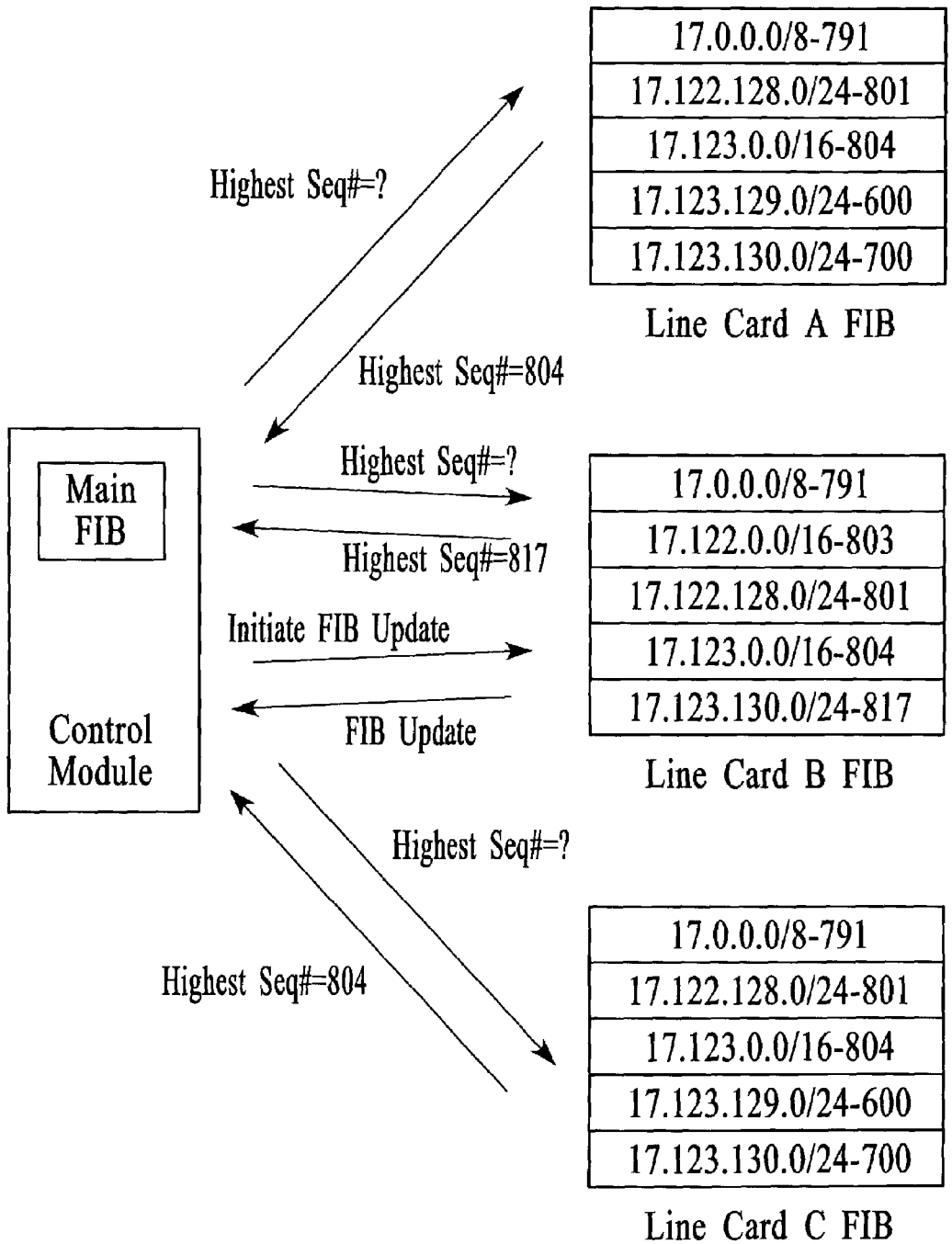
FIG. 7 illustrates an example process of selecting a line card FIB for use in updating a main or backup FIB in accordance with an embodiment of the invention.

In addition to determining how to update a line card FIB to be synchronized with a main FIB, there are instances where it is desirable for a main FIB or a backup FIB to be synchronized with a line card FIB. Because a distributed architecture switch/router typically includes multiple line cards that each include an instance of the FIB, there is a need to identify which instance of the FIB should be used to update the main or backup FIB. In accordance with an embodiment of the invention, the sequence numbers that are associated with the FIB entries are used to identify a line card with the most current FIB. In an embodiment, the line card with the most current FIB is identified by identifying the line card with the highest sequence number for an FIB entry. The line card with the most current FIB is then used to update the main or backup FIB. FIG. 7 illustrates an example process of selecting a line card FIB for use in updating a main or backup FIB. As depicted in FIG. 7, the control module polls the line cards. In response to the polling, the line cards identify the highest sequence number of all of the FIB entries that are stored in the respective FIBs. The response of the line cards enables the control module to identify the highest sequence number of all of the FIB entries that are stored in the respective FIB. In the example of FIG. 7, the highest sequence number for line card A is 804, the highest sequence number for line card B is 817, and the highest sequence number for line card C is 804. The fact that line card B has the FIB entry with the highest sequence number indicates that line card B has the most current forwarding information. The instance of the FIB in line card B is then used to update the main or backup FIB as indicated by arrow 750.

Figure 8:
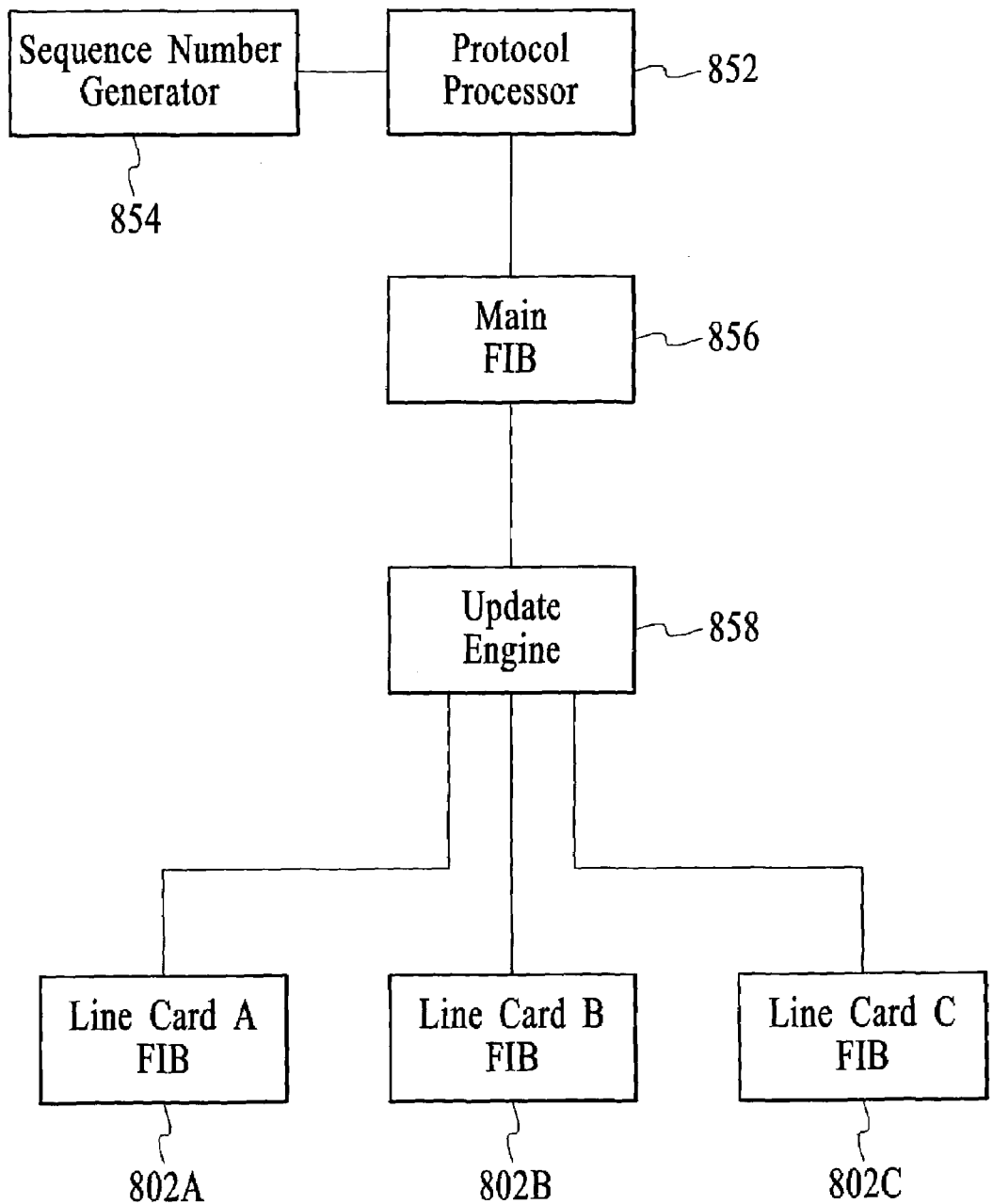
FIG. 8 depicts an embodiment of a system for synchronizing multiple instances of an FIB in a network node that has a distributed architecture in accordance with an embodiment of the invention.

FIG. 8 depicts an embodiment of a system for synchronizing multiple instances of an FIB in a network node that has a distributed architecture. The system includes a protocol processor 852, a sequence number generator 854, a main FIB 856, an update engine 858, and multiple line card FIBs (802A, 802B, and 802C). The protocol processor generates the FIB entries and manages the main FIB. The sequence number generator provides counter values to the protocol processor. As described above, the protocol processor associates a new counter value to each newly generated FIB entry and to each changed, or modified, FIB entry. The main FIB is the central repository for the FIB entries. The update engine manages the updating of the line card FIBs and/or the updating of the main FIB (or backup FIB) to ensure that the multiple instances of the FIBs are synchronized. In an embodiment, the update engine performs the synchronization tasks that are described above.

In an embodiment, the FIB includes layer 3 routing information. In another embodiment, the FIB includes layer 2 switching information although the FIB could include other types of forwarding information. In addition, although the FIB entry described with regard to FIG. 3 and the FIB entry segment described with regard to FIG. 4 are depicted as having a destination IP field and a mask field, the FIB entry and FIB entry segment may include different and/or additional fields (i.e., destination MAC address, source IP address, source/destination socket, etc.).

It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for synchronizing multiple instances of a forwarding information base (FIB) in a network node that has a distributed processing architecture comprising:
   establishing FIB entries in a main FIB;
   associating a sequence number with each of said FIB entries in said main FIB;
   communicating said FIB entries and their associated sequence numbers from said main FIB to line card FIBs; and
   using said sequence numbers that are associated with said FIB entries to determine the most current FIB entry among a plurality of FIB entries;
   wherein said sequence numbers are used to determine the most current FIB entry among two FIB entries that have matching IP addresses and masks.

2. The method of claim 1 wherein using said sequence numbers that are associated with said FIB entries to determine the most current FIB entry involves sending current state messages between said main FIB and one of said line card FIBs to determine how to synchronize said main FIB with said one line card FIB, said current state messages including FIB entry segments, each FIB entry segment having a unique sequence number that is associated with the respective FIB entry segment.

3. The method of claim 2 further including using the sequence numbers of an FIB entry segment and an FIR entry to determine which of the two associated FIB entries is the most current FIB entry.

4. The method of claim 3 further including sending an FIB entry from said main FIB to one of said Line card FIBs if the sequence number of an FIB entry from said main FIB is higher than the sequence number of an FIB entry from said one line card FIB.

5. The method of claim 2 wherein said FIB entry segments include a destination IP field, a mask field, and a sequence number field.

6. The method of claim 1 wherein using said sequence numbers that are associated with said FIB entries to determine the most current FIB entry includes using said sequence numbers to identify a line card FIB, amongst a plurality of line card FIBs, which has the most current FIB entry.

7. The method of claim 6 wherein the line card FIB that has an FIB entry with the highest associated sequence number is identified as the line card FIB with the most current FIB entry.

8. The method of claim 6 further including using the FIB from the line card with the most current FIB entry to update another FIB.

9. The method of claim 8 wherein said FIB from the line card with the most current FIB entry is used to update either said main FIB or a backup FIB.

10. The method of claim 1 wherein said main FIB is stored at a control module of said network node and wherein said line card FIBs are stored at line cards of said network node, said line cards including ports for connecting to other network nodes.

11. A system for synchronizing multiple instances of a forwarding information base (FIB) in a network node that has a protocol processor for establishing FIB entries in a main FIB and a plurality of line card FIBs, said system comprising:
    a sequence number generator for providing sequence numbers that are associated with FIB entries; and
    an update engine for:
        communicating said FIB entries and their associated sequence numbers from a main FIB to multiple line card FIBs; and
        using said sequence numbers that are associated with said FIB entries to determine the most current FIB entry among a plurality of FIB entries;
        wherein said sequence numbers are used to determine the most current FIB entry among two FIB entries that have matching IP addresses and masks.

12. The system of claim 11 wherein said update engine initiates sending current state messages between said main FIB and one of said line card FIBs to determine how to synchronize said main FIB with said one line card FIB, said current state messages including FIB entry segments, each FIB entry segment having a unique sequence number that is associated with the respective FIB entry segment.

13. The system of claim 12 wherein the sequence numbers of an FIB entry segment and an FIB entry are used to determine which of the two associated FIB entries is the most current FTB entry.

14. The system of claim 12 wherein an FIB entry from said main FIB is sent to one of said line card FIBs if the sequence number of an FIB entry from said main FIB is higher than the sequence number of an FIB entry from said one line card FIB.

15. The system of claim 12 wherein said FIB entry segments include a destination IP field, a mask field, and a sequence number field.

16. The system of claim 11 wherein using said sequence numbers that are associated with said FIB entries to determine the most current FIB entry includes using said sequence numbers to identify a line card FIB, amongst a plurality of line card FIBs, which has the most current FIB entry.

17. The system of claim 16 wherein the line card FIB that has an FIB entry with the highest associated sequence number is identified as the line card FIB with the most current FIB entry.

18. The system of claim 11 further including a control module for storing said main FIB and multiple line cards for storing said line card FIBs.

19. A method for synchronizing multiple instances of a forwarding information base (FIB) in a network node that has a distributed processing architecture comprising:
    establishing FIB entries in a main FIB;
    associating a sequence number with each of said FIB entries in said main FIB;
    communicating said FIB entries and their associated sequence numbers from said main FIB to line card FIBs; and
    using said sequence numbers that are associated with said FIB entries to manage FIB updates between said main FIB and said line card FIBs, including using said sequence numbers that are associated with said FIB entries to determine the most current FIB entry among a plurality of FIB entries;
    wherein using said sequence numbers that are associated with said FIB entries to determine the most current FIB entry includes using said sequence numbers to identify a line card FIB, amongst a plurality of line card FIBs, which that has the most current FIB entry.

20. The method of claim 19 wherein the line card FIB that has an FIB entry with the highest associated sequence number is identified as the line card FIB with the most current FIB entry.

21. The method of claim 19 further including using the FIB from the line card with the mast current FIB entry to update either said main FIB or a backup FIB.

* * * * *